United States Patent [19]
Hulzebos

[11] Patent Number: 5,997,048
[45] Date of Patent: Dec. 7, 1999

[54] FLUID CONNECTION

[75] Inventor: Peter Bernard Hulzebos, Enschede, Netherlands

[73] Assignee: Applied Power Inc., Butler, Wis.

[21] Appl. No.: 08/980,117

[22] Filed: Nov. 26, 1997

[30] Foreign Application Priority Data

Dec. 3, 1996 [NL] Netherlands ............................ 1004679

[51] Int. Cl.$^6$ ............................. F16L 37/08; F16L 13/14
[52] U.S. Cl. ............................................ 285/305; 285/382
[58] Field of Search ..................................... 285/305, 382

[56] References Cited

U.S. PATENT DOCUMENTS

| | | | |
|---|---|---|---|
| 3,538,940 | 11/1970 | Graham | 137/271 |
| 3,929,356 | 12/1975 | DeVincent et al. | 285/305 |
| 4,378,795 | 4/1983 | Feathers et al. | 285/305 |
| 4,526,411 | 7/1985 | Bartholomew | 285/305 |
| 4,600,221 | 7/1986 | Bimba | 285/305 |
| 4,768,587 | 9/1988 | Halder | 285/305 |
| 4,813,716 | 3/1989 | Lalikos et al. | 285/305 |
| 4,991,880 | 2/1991 | Bernart | 285/305 |
| 5,273,323 | 12/1993 | Calmettes et al. | 285/305 |
| 5,472,242 | 12/1995 | Petersen | 285/305 |
| 5,593,187 | 1/1997 | Okuda et al. | 285/305 |
| 5,607,192 | 3/1997 | Lee | 285/305 |
| 5,653,475 | 8/1997 | Scheyhing et al. | 285/305 |
| 5,695,223 | 12/1997 | Boticki | 285/305 |
| 5,711,549 | 1/1998 | Beans | 285/305 |
| 5,765,877 | 6/1998 | Sakane et al. | 285/305 |
| 5,797,627 | 8/1998 | Salter et al. | 285/305 |

FOREIGN PATENT DOCUMENTS

3817472 C2  11/1989  Germany .

*Primary Examiner*—Eric K. Nicholson
*Attorney, Agent, or Firm*—Quarles & Brady LLP

[57] ABSTRACT

A connection between a fluid line and a connecting element, in which at one end the line has an insertion part, and the connecting element is provided with an bore for accommodating the insertion part of the line, in which the line is provided with a locking shoulder, and in which the connecting element is designed to accommodate a locking element, which locking element when fitted covers the locking shoulder of the line, so that the insertion part of the line is locked in the bore of the connecting element, in which the bore, viewed in the insertion direction of the insertion part has a first part with a first diameter and connecting thereto a second part with a second diameter which is smaller than the first diameter. At the bore of the connecting element an receiving element for the locking element is fitted immovably, which receiving element has a through axial bore connecting to the bore, in such a way that the insertion part of the line projects through the axial bore of the receiving element and projects into the bore of the connecting element. The receiving element is provided with an outward projecting annular flange which fits into the first part of the bore. The annular flange of the receiving element is fixed in the first part of the bore by deformation of the connecting element.

3 Claims, 4 Drawing Sheets

FLUID CONNECTION

FIELD OF THE INVENTION

The present invention relates to a connection between a fluid line and a connecting member, in particular a hydraulic cylinder, in which at one end thereof the fluid line has an insertion fitting and the connecting member is provided with a bore for accommodating the insertion fitting of the fluid line, in which the insertion fitting is provided with a locking shoulder, and in which the connecting member is adapted for accommodating a locking element, which locking element when fitted covers the locking shoulder of the fluid line, so that the insertion fitting part of the fluid line is locked in the bore of the connecting member.

BACKGROUND OF THE INVENTION

U.S. Pat. No. 3,538,940 discloses a connection between a distibutor block and several fluid lines. The distributor block is provided with an bore for receiving an insertion fitting fitted to the end of a fluid line. In the case of this known connection the fluid line fitting is locked by means of a U-shaped metal clip which is slided into a slot formed in the distributor block and running parallel to the insertion side of the bore.

The disadvantage of this known connection is that making the slot in the distributor block requires a special milling operation which is complicated, in particular if the connecting member has a cylindrical shape.

OBJECT OF THE INVENTION

The present invention aims to provide an improved connection which can be achieved considerably more cheaply than the known connection. The present invention also aims to provide a connection which can be fitted and removed very easily.

SUMMARY OF THE INVENTION

The present invention provides a connection wherein at the bore of the connecting member a separate receiving element for the locking element is fitted immovably on said connection member, which receiving element has a through axial bore connecting to the bore in the connecting member such that the insertion fitting of the fluid line projects through the axial bore of the receiving element and into the bore of the connecting member. The receiving element is provided with an outward projecting annular flange which fits into the first part of the bore in the connecting member and the annular flange is fixed in the first part of the bore in the connection member by deformation of the connecting member.

The invention therefore provides for a separately manufactured receiving element to be fitted immovably on the connecting member. Fixing the receiving element on the connecting member can be achieved simply and reliably by means of a press rivet operation. The fluid line is fixed detachably on the receiving element by means of the locking element. The result of the measures according to the invention is that the connecting member can be produced in a simple manner. Furthermore, in principle, a single embodiment of the connecting member can be provided as desired with a desired embodiment of the connection to a fluid line, because a receiving element which is especially adapted to the desired connection to the fluid line can subsequently be fitted on the standard connecting member. Moreover, the production of the receiving element as a separate part is considerably simpler than if the receiving element were an integral part of the connecting member, as in the case of the known connection.

Further advantageous embodiments of the invention are described in the claims and in the description which follows, in which the invention will be explained in greater detail with reference to the drawing.

DETAILED DESCRIPTION OF PREFERRED EMBODIMENTS

Figure 1:
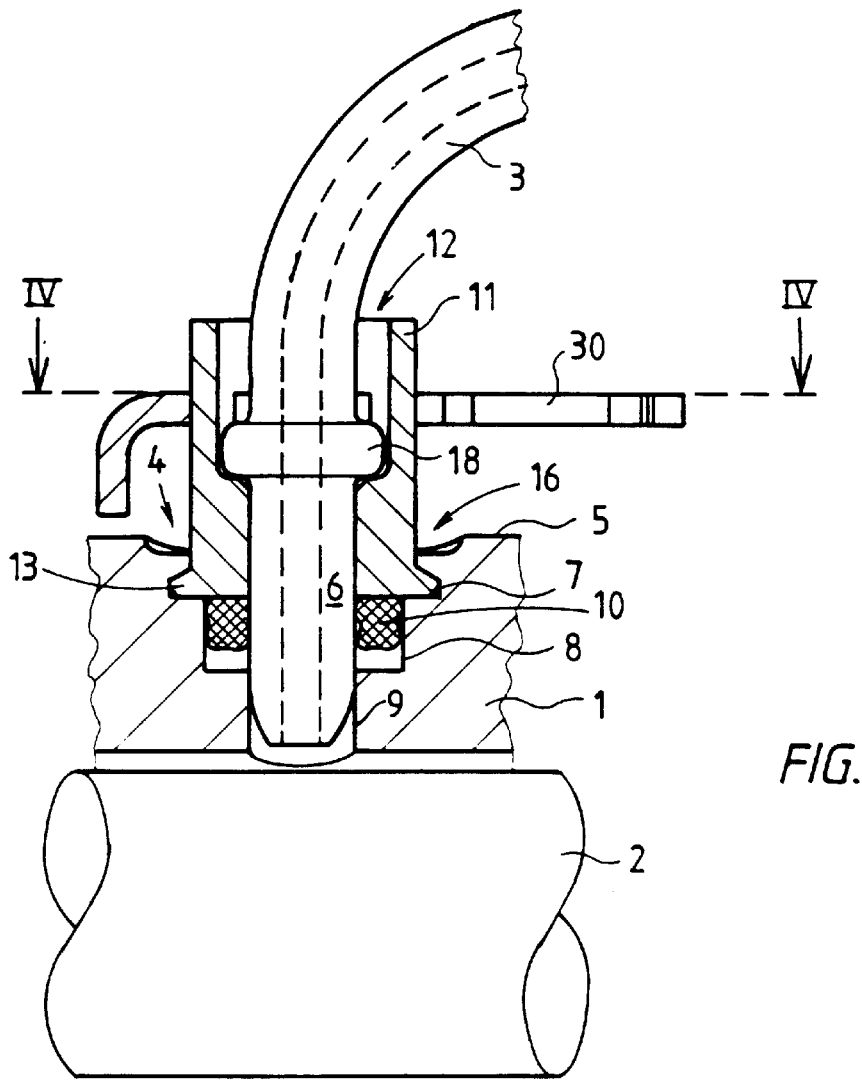
FIG. 1 shows in longitudinal section a part of the gland and the piston rod of a hydraulic cylinder which is provided with a first exemplary embodiment of the fluid insertion connection according to the invention.

FIG. 1 shows a metal gland 1 of a hydraulic linear cylinder with a central axial bore through which the piston rod 2 of the cylinder projects.

An insertion bore 4 is formed in the gland 1, for connection of the working chamber of the cylinder at the piston rod side to hydraulic line 3. The insertion side of the bore 4 lies in the external face 5 of the gland 1.

The fluid line 3 has an insertion fitting 6 which fits into the bore 4.

Viewed in the insertion direction of the insertion fitting 6, the bore 4 has a first part 7 with a first diameter which connects to the external face 5 of the gland 1, and connecting thereto, a second part 8 with a second diameter which is smaller than the first diameter, and finally a third part 9 with a third diameter which is smaller than the second diameter. A rubber sealing ring 10, in this example a so-called Quad ring, is accommodated in the second part 8 of the bore 4.

At the bore 4, the gland 1 is provided with a metal bush 11 serving as the receiving element for a locking element to be described later. Said bush 11 has an axial through bore 12 connecting to the bore 4 (see FIG. 2), so that the insertion fitting 6 of the line 3 projects through the axial bore 12 of the bush 11 into the bore 4 of the gland 1.

At an axial end thereof, the bush 11 has an outward projecting annular flange 13, which fits into the first part 7 of the bore 4. Said annular flange 13 is fixed in the first part 7 of the insertion bore 4 by deformation of the annular region of the gland 1 situated around the insertion bore 4. For said operation, an annular die is placed around the bush 11 on a metal annular region 16 of the gland 1 and pressure is then applied with great force, so that the edge region of the gland 1 projecting above the annular flange 13 of the bush 11 is deformed over the annular flange 13, and the annular flange 13 is thereby firmly fixed by the deformed metal.

For locking of the fluid line 3, at a distance from the free end of the insertion fitting 6 said fluid line 3 is provided with an outward projecting annular flange 18 which serves as a locking shoulder.

Figure 2:
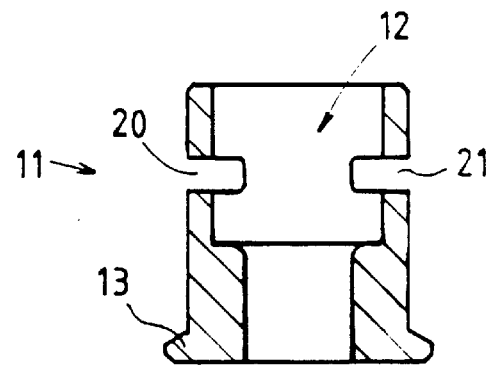
FIG. 2 shows the receiving element in section at right angles to the plane of FIG. 1.

The bush 11 is provided on either side adjacent to the axial bore 12 thereof with a slit 20, 21 extending at right angles to said axial bore 12, which can be seen clearly in FIG. 2. The slits 20, 21 are parallel to each other and have a distance between them which is smaller than the axial bore 12 at that point.

Figure 3:
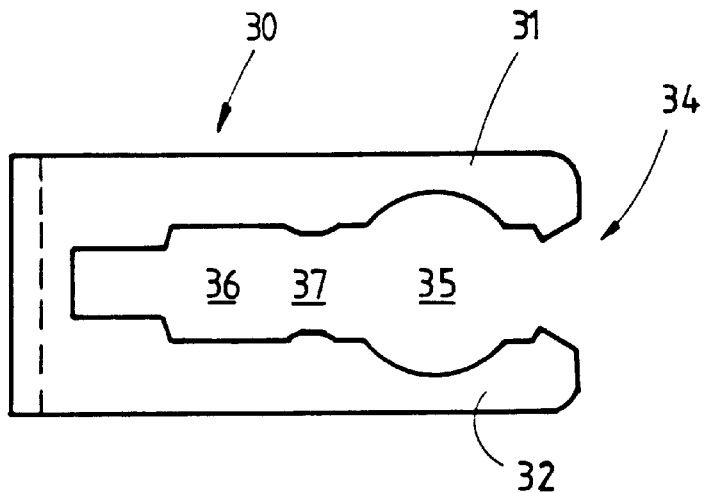
FIG. 3 shows in top view the locking element of FIG. 1.
Figure 4A:
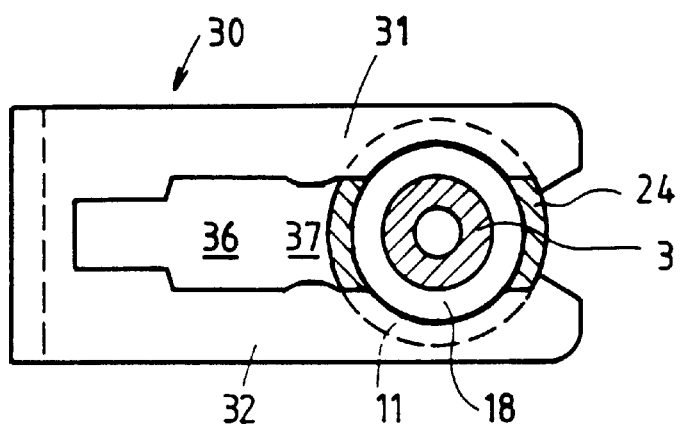
FIGS. 4a and 4b show in section along the line IV—IV the locking element, the receiving element and the line, in the state in which the line can be fitted or removed and in the state in which the line is locked respectively.
Figure 4B:
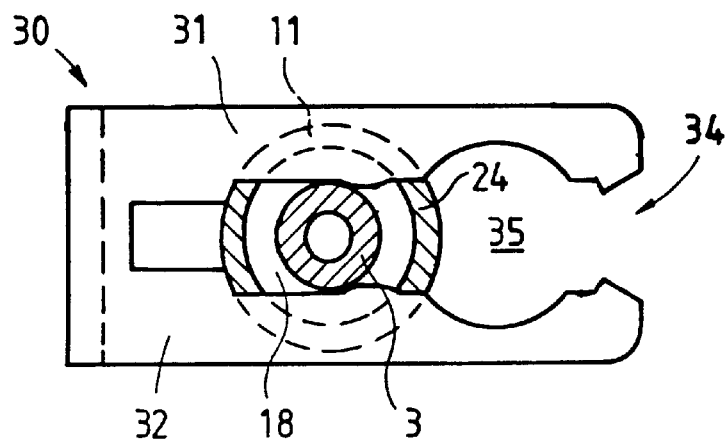

A locking element 30, shown in detail in FIGS. 3, 4a and 4b, is provided for locking the fluid line 3. The locking element 30 is made of metal and is substantially U-shaped and has two legs 31, 32. In the fitted state of the locking element 30, the legs 31, 32 each project into one of the slits 20, 21 of the bush 11, the legs 31, 32 lying on either side along the fitting 6 and thereby covering the annular flange 18.

It can be seen from FIGS. 3, 4a and 4b that the legs 31, 32 of the locking element 30 between them define a slit aperture 34 which comprises a first slit part 35, through which the annular flange 18 of the line 3 fits when the first slit part 35 is aligned relative to the bore 4 (see FIG. 4a), and a second slit part 36, which is connected to the first slit part 35 and is narrower than the first slit part 35, so that when the second slit part 36 is aligned relative to the bore 4 (see FIG. 4b) a part of the two legs 31, 32 of the locking element 30 covers the annular flange 18 of the line 3, with the result that the insertion fitting 6 is locked and cannot be pulled out.

The slit aperture 34 between the two legs 31, 32 of the locking element 30 also comprises a third slit part 37, which connects the first slit part 35 and the second slit part 36 to each other, at one point at least the third slit part 37 bounding a narrow passage which is smaller than the corresponding dimension of the part of the insertion part of the line 3 which passes through the third slit part 37 during the movement of the locking element 30. Since the legs 31, 32 can be moved resiliently apart, the insertion fitting can overcome a resistance and pass through the third slit part 37, and the locking element 30 is then secured in position.

It can also be seen in FIG. 4a that the slit aperture 34 between the two legs 31, 32 of the locking element 30 near the free end of the two legs is narrower than the corresponding dimension of a wall part 24 of the bush 11 situated between the two slits 21, 22 in the bush 11. This means that, once it has been inserted with its legs 31, 32 in the slits 21, 22 of the bush 11, the locking element 30 is retained, also in the position of FIG. 4a.

Figure 5:
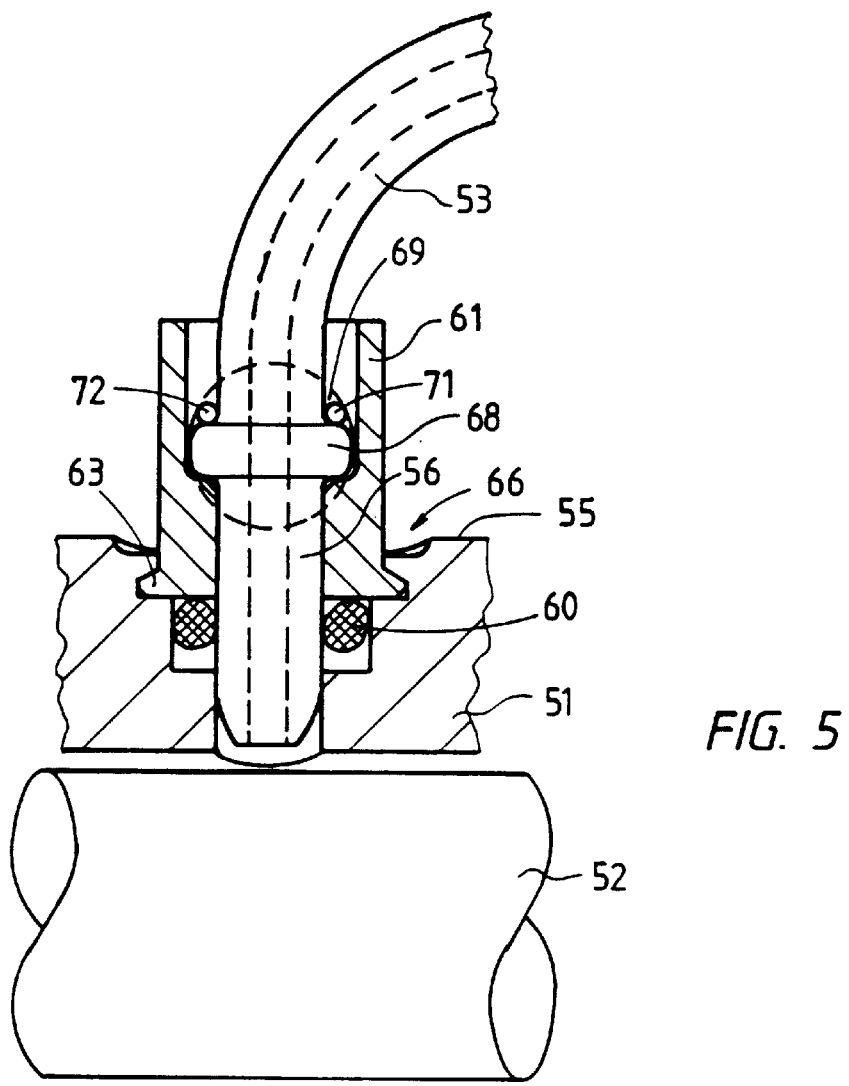
FIG. 5 shows in longitudinal section a part of the gland and the piston rod of a hydraulic cylinder which is provided with a second exemplary embodiment of the fluid insertion connection according to the invention.
Figure 7:
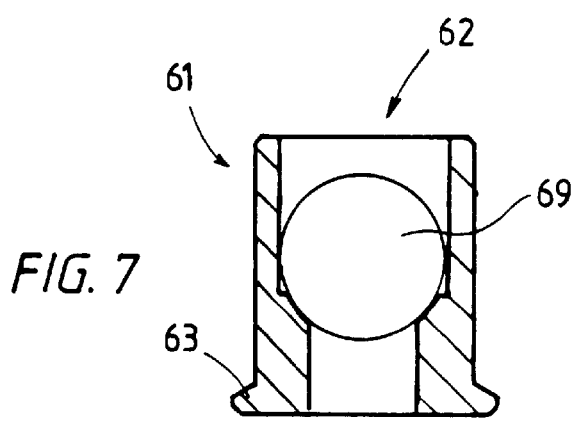
FIG. 7 shows in section according to FIG. 5 the receiving element to be fixed immovably on the gland.

FIG. 5 shows a metal gland 51 of a hydraulic linear cylinder with a central axial bore for the piston rod 52 of the cylinder.

Figure 6:
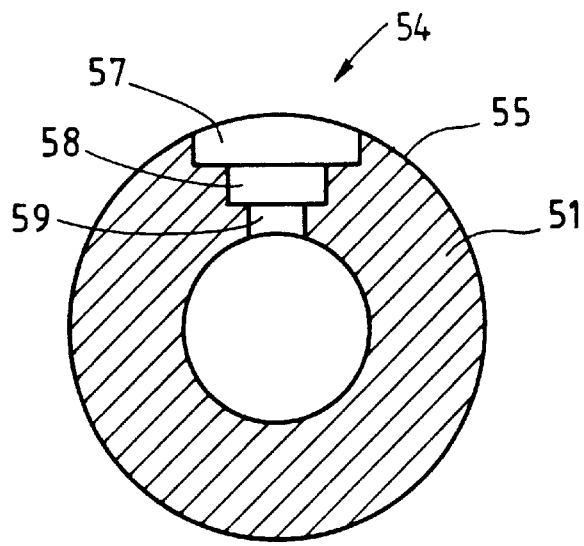
FIG. 6 shows the cross-section of the gland in FIG. 5.

For connection of the working chamber of the cylinder at the piston rod side to line 53, an insertion bore 54 is formed in the gland 51, which bore can be seen clearly in FIG. 6 in particular. The insertion side of the bore 54 lies in the external face 55 of the gland 51. The line 53 has an insertion fitting 56 which fits into the bore 54.

Viewed in the insertion direction of the insertion fitting 56, the bore 54 has a first part 57 with a first diameter which connects to the external face 55 of the gland 51 connecting thereto, a second part 58 with a second diameter which is smaller than the first diameter, and finally a third part 59 with a third diameter which is smaller than the second diameter. A rubber O-ring 60 is accommodated in the second part 58 of the bore 54.

Figure 8:
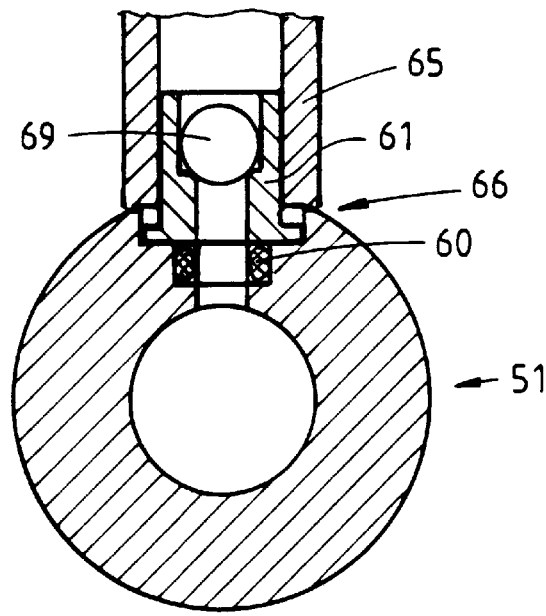
FIG. 8 shows a section according to FIG. 6 of the fixing of the receiving element on the gland.

At the bore 54, the gland 51 is provided with a metal bush 61 serving as the receiving element for a locking element to be described later. Said bush 61 has an axial bore 62 connecting to the bore 54 (see FIG. 8), so that the insertion fitting 56 of the line 53 projects through the axial bore 62 of the bush 61 into the bore 54 of the gland 51.

At an axial end thereof, the bush 61 has an outward projecting annular flange 63, which fits into the first part 57 of the bore 54. Said annular flange 63 is fixed in the first part 57 of the insertion bore 54 by deformation by means of a press riviting operation of the annular region of the gland 51 situated around the bore 54. For said operation, an annular die 65 (see FIG. 8) is placed around the bush 61 on annular region 66 of the gland 51 and pressure is then applied with great force, so that the edge region of the gland 51 projecting above the annular flange 63 of the bush 61 is deformed over the annular flange 63, and the annular flange 63 is thereby firmly fixed.

Figure 9:
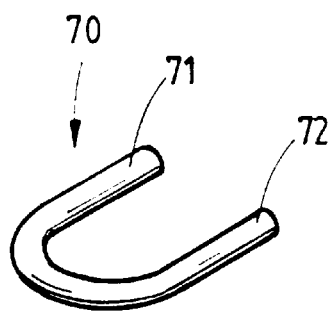
FIG. 9 shows in perspective the locking element of FIG. 5.

For locking of the line 53, at a distance from the free end of the fitting 56 of said line 53 is provided with an outward projecting annular flange 68. The bush 61 is also provided with a transverse bore 69 situated substantially at right angles to axial bore 62 and running through the bush 61. The transverse bore 69 serves to accommodate an insertable locking element 70, which locking element 70 is substantially U-shaped (see FIG. 9) with two legs 71 and 72. When the line 53 with insertion fitting 56 is inserted into the axial bore 62 of the bush 61 and the bore 54 of the gland 51, the annular flange 68 of the line 53 is situated at the level of the transverse bore 69. Inserting the clamping element 70 from the outside into the transverse bore 69 causes the legs 71 and 72 thereof to lie on either side of the fluid line 53 over the annular flange 68, so that the insertion fitting 56 of the fluid line 53 can no longer be pulled out of the gland 51.

The diameter of the part of the axial bore 62 adjoining the gland 51 and the diameter of the third part 59 of the bore 54 are such that the fitting 56 fits therein with slight play. The O-ring 60 produces the sealing connection of the fluid line 53 on the gland 51.

What is claimed is:

1. A connection between a fluid line and a hydraulic cylinder, comprising:

a metal gland at an end of said cylinder, said gland having an external face and a piston rod of said cylinder projecting through said gland, the gland being provided with a bore which has a first part and a second part, the first part of the bore having a first diameter and connecting the external face of the gland and the second part of the bore, the second part of the bore having a second diameter which is smaller than the first diameter;

an insertion fitting at an end of the fluid line, the insertion fitting being provided with a locking shoulder; and a locking element;

a receiving element in the bore in the gland, which receiving element is adapted for accommodating said locking element, which locking element when fitted to said receiving element covers the locking shoulder of the insertion fitting of the fluid line so that the insertion fitting of the fluid line is locked in the bore of the receiving element;

wherein:

said receiving element has a through axial bore connecting to the bore of the gland such that the insertion fitting of the fluid line projects through the axial bore of the receiving element and into the bore of the gland;

said receiving element has an outwardly projecting fixation part which fits into the first part of the bore of the gland such that an annular region around the first part of the bore in the gland adjacent the external face of the gland projects above said fixation part; and said fixation part of the receiving element is fixed in the first part of the bore of the gland by deformation of said annular region of the gland so that said region is deformed over said fixation part.

2. A connection according to claim 1, wherein the bore of the gland has a third part connecting to the second part and having a third diameter which is smaller than the second diameter, and wherein a sealing ring is present in the second part of the bore for providing a fluid seal between the insertion fitting of the fluid line and the gland.

3. A connection according to claim 2, wherein the receiving element is received in the first part of the bore and the sealing ring is held in the second part of the bore by an axially facing surface of the receiving element.

\* \* \* \* \*